United States Patent Office 2,943,080
Patented June 28, 1960

2,943,080
COPOLYMERS OF TETRAFLUOROETHYLENE AND FLUORINATED OLEFINS

Manville Isager Bro, Wilmington, Del., assignor to E. I. du Pont de Nemours and Company, Wilmington, Del., a corporation of Delaware No Drawing. Filed Dec. 11, 1956, Ser. No. 627,570

8 Claims. (Cl. 260—87.5)

The present invention relates to novel copolymers of tetrafluoroethylene, and in particular, to novel polymers of tetrafluoroethylene and fluorinated α-olefins.

The homopolymer of tetrafluoroethylene, polytetrafluoroethylene, has become well known for its many outstanding physical and chemical properties. Thus, the polymer retains its toughness and strength at extremely low temperatures as well as elevated temperatures. Polytetrafluoroethylene is resistant to chemical attack by almost all chemicals. The electrical properties of the polymer make it an outstanding insulator. Polytetrafluoroethylene, however, has one disadvantage in that it has an extremely high melt viscosity. Although the polymer has a clearly defined crystalline melting point at 327° C. at which the polymer becomes a liquid, the melt viscosity of the polymer is so high that the molten polytetrafluoroethylene appears to be very stiff and flows only very slowly. Injection molding and melt extrusion of the polymer, generally employed in the fabrication of thermoplastics, are thus applied only with great difficulty in the fabrication of polytetrafluoroethylene. A lowering of the molecular weight of the polymer to obtain the desired melt viscosity leads to brittle polymers. The copolymerization of tetrafluoroethylene with ethylenically unsaturated monomers of similar structure, such as ethylene and halogen substituted ethylenes, will give rise to copolymers having sufficiently low melt viscosities for fabrication by conventional plastics extrusion or molding techniques but only at some sacrifice of those physical and chemical properties which make polytetrafluoroethylene so useful. Copolymers of tetrafluoroethylene prepared heretofore required the presence of large quantities of the comonomer in the polymer chain to obtain a polymer which had a sufficiently low enough melt viscosity to be suitable for conventional melt fabrication.

It is an object of the present invention to prepare novel fluorinated polymers. It is a further object of the present invention to prepare fluorinated polymers having physical and chemical properties similar to polytetrafluoroethylene. Another object of the present invention is the preparation of fluorinated polymers which have sufficient melt flow to be fabricated by melt extrusion and injection molding. It is a further object to provide a process for the copolymerization of tetrafluoroethylene to give rise to novel fluorinated polymers. Other objects will become apparent hereinafter.

The objects of the present invention are accomplished by preparing a copolymer of tetrafluoroethylene with a terminally unsaturated fluoro-olefin having the general formula $CF_2=CF-(C_nF_{2n})-CF_2X$, wherein X is a hydrogen or a fluorine atom and $n$ is a whole number from 1 to 9. In a specific embodiment of the present invention copolymers of tetrafluoroethylene and long-chain fluorinated olefins are prepared that contain 0.1% to 5% of the long-chain fluorinated olefin as the comonomer.

It has now been discovered that long chain fluorinated olefins can be polymerized with tetrafluoroethylene to give rise to polymeric products which at melt viscosity levels suitable for conventional melt fabrication, have physical properties substantially the same as polytetrafluoroethylene of melt viscosities unsuitable for melt fabrication. The melt viscosity of a highly fluorinated thermoplastic polymer, to be suitable for melt fabrication should not exceed $1\times10^6$ poises at the fabrication temperature, if the polymer is to be melt extruded and should not exceed $1\times10^5$ poises if the polymer is to be injection molded. These limits were determined experimentally employing commercially available equipment at reasonable rates of production. Polytetrafluoroethylene having the outstanding physical properties described hereinabove, has melt viscosities in the range of $1\times10^{11}$ to $1\times10^{13}$ poises at 380° C. If the melt viscosity of the homopolymer is reduced to a level suitable for melt fabrication by decreasing the molecular weight a brittle polymer is obtained. If tetrafluoroethylene is copolymerized with the comonomers employed heretofore, copolymers having suitable melt viscosities for melt fabrication are significantly inferior to the homopolymer in high temperature properties, chemical inertness and toughness. It was furthermore discovered that the desired melt viscosities, in contrast to the teachings of the prior art, could be obtained at exceedingly low concentration of the fluoro-olefin in the polymer chain.

The preferred copolymers of the present invention are copolymers of tetrafluoroethylene and fluoro-olefins containing from 0.1 to 5% by weight of the fluoro-olefin in the polymer chain. It is in this range that the most significant decrease in melt viscosity is obtained. The melt viscosity of the copolymers of the present invention may be further decreased by introducing a larger proportion of the long chain fluorinated olefin into the copolymer. However, the further decrease in melt viscosity of the copolymer is significantly smaller as compared to the decrease obtained in the preferred range and not necessary to impart melt fabricability to the copolymer. Furthermore, increasing the proportion of the fluorinated olefin in the copolymer beyond the preferred concentration will cause a significant lowering of the high temperature properties of the copolymer and is for that reason not beneficial.

The fluorinated olefins employed in the present invention are terminally unsaturated perfluorinated olefins and terminally unsaturated fluorinated olefins containing one hydrogen in the end position to the double bond which have at least 4 and not more than 12 carbon atoms. It has been found that the presence of one hydrogen in the end position of the olefin does not seriously affect the inertness of the monomer during polymerization nor the inertness of the resulting copolymer. Olefins containing more than one hydrogen or containing other substituents act as chain-transfer agents in the polymerization and cause the formation of undesirable low molecular weight copolymers if present in large quantities. Perfluorinated olefins employed in the present invention can be prepared by various methods, such as shown in U.S. Patent 2,668,864 issued to Hals et al., on February 9, 1954. In this method the alkali metal salt of a perfluorinated acid is pyrolytically decarboxylated and defluorinated to result in a perfluorinated olefin. The hydrogen-containing fluoro-olefins are prepared by methods illustrated in U.S. Patent 2,559,628 issued July 10, 1951, to R. M. Joyce, U.S. Patent 2,559,629, issued July 10, 1951, to K. L. Berry, and U.S. Patent 2,668,864, mentioned hereinabove. The fluoro-olefins are prepared by polymerizing tetrafluoroethylene in the presence of methanol, which causes the formation of fluorine-containing alcohols. The fluorine-containing alcohols are oxidized to the acid, and the sodium salt of the acid is pyrolytically decarboxylated to result in the hydrogen-containing fluoro-olefin. The fluorinated olefins employed in the present invention may have a linear structure or may be of a branched structure.

The polymerization of tetrafluoroethylene with the fluorinated olefins may be carried out by various procedures. Thus, the polymerization may be carried out in an aqueous medium employing a peroxidic catalyst. The temperature in such a system may be varied from 25 to 200° C. and the pressure of the gaseous tetrafluoroethylene may be varied from atmospheric pressure to pressures exceeding 500 atmospheres. A preferred method employed for the copolymerization of tetrafluoroethylene with the fluorinated olefin comprises the polymerization of the monomers in an inert perfluorinated liquid diluent employing preferably a fluorinated peroxide as the catalyst. Perfluorinated liquid diluents suitable are perfluorinated straight chain, cyclic and branched hydrocarbons. This polymerization process can be employed over a wide range of polymerization conditions; optimum polymerization conditions, such as temperature, pressure, and catalyst concentrations, will vary with the comonomer employed and the copolymer to be prepared. Where the fluorinated olefin is liquid at the polymerization conditions, the fluorinated olefin may be employed as the medium. Since the reactivity of the fluorinated olefin towards polymerization is low, the fluorinated olefin can be present in large excess. The copolymerization may further be carried out in the gas phase.

The ratio of the tetrafluoroethylene to the fluorinated olefin comonomer in the polymer is controlled primarily by the ratio of the two monomers in the feed and the polymerization temperature. The low reactivity of the fluoro-olefin towards polymerization requires the presence of relatively large quantities of the comonomer in the feed. The reactivity of the comonomer varies with each individual comonomer employed, and generally decreases as the number of carbon atoms in the fluorinated olefin is increased. Because of the low reactivity of fluorinated olefins containing more than 12 carbons, they are less desirable as comonomers, since the reaction time required to obtain high molecular weight polymers is greatly increased.

The present invention is further illustrated by the following examples in which the fluorinated olefin content of the copolymer was determined by infrared spectrometry and substantiated by pyroysis of the copolymer and analysis of the pyrolysis gases.

Example I

Into a 330 ml. stainless steel pressure vessel was charged 25 ml. of perfluorocyclohexane, 20 g. of perfluoroheptene-1, 0.0037 g. of perfluorobutyryl peroxide in 0.25 ml. of perfluorodimethylcyclohexane and 20 g. of tetrafluoroethylene. The reaction vessel was agitated for two hours at autogenous pressure and maintained at a temperature of 35 to 60° C. On cooling, removal of excess monomer and filtering there was obtained 6.6 g. of solid polymeric material. The polymer was found to contain 0.8% of perfluoroheptene-1 with a melting point of 312° C. to 315° C., and a melt viscosity of $3.2 \times 10^5$ poises at 380° C. The copolymer could be melt extruded and molded into tough films.

Example II

Into a 330 ml. stainless steel pressure vessel was charged 20 g. of perfluoroheptene-1, 5 g. of tetrafluoroethylene and 0.017 g. of oxygen. The reaction mixture was heated under autogenous pressure to 135° C. and held at that temperature for 5.5 hours. The reaction mixture was then heated to 150° C. and held at that temperature for 1.5 hours. On cooling and removal of excess monomer there was obtained 4.5 g. of copolymer. Tough films were prepared from the copolymer by compression molding at 380° C. Analysis of the copolymer indicated the presence of 1.4% perfluoroheptene-1 in the copolymer. The melt viscosity of the copolymer was measured to be $3.5 \times 10^6$ poises at 380° C.

Example III

Into a 330 ml. stainless steel pressure vessel was charged 23 ml. of perfluorodimethylcyclohexane, 10 g. of perfluoroheptene-1, 15 g. of tetrafluoroethylene and 0.075 g. of perfluorobutyryl peroxide in 0.5 g. of perfluorodimethylcyclohexane. The reaction mixture was agitated under autogenous pressure at 60° C. for a period of three hours. On cooling and removal of excess monomer and solvent there was obtained 3.0 g. of a solid polymeric material. The analysis showed that the polymer contained 2.0% of perfluoroheptene-1. The copolymer was found to have a melt viscosity at 380° C. of $4.7 \times 10^4$ poises. The melting point of the polymer was 315 to 316° C. Compression molding of the copolymer at 380° C. resulted in tough, clear films. The copolymer could be melt spun from a press spinner at 395° C. with a 0.02" hole diameter spinneret. The pressure applied was 2000 p.s.i., the windup speed was 46 y.p.m. with a spin stretch of 55 resulting in 94 denier fibers. The fibers obtained were found to have a tenacity of 0.21 g./denier, an elongation of 6.7% and a modulus of 8.2 g./denier.

Example IV

Into a 330 ml. stainless steel pressure vessel was charged 23 ml. of perfluorodimethylcyclohexane, 40 g. of perfluorononene-1, 15 g. of tetrafluoroethylene and 0.075 g. of perfluorobutyryl peroxide in 0.5 ml. of perfluorodimethylcyclohexane. The reaction vessel was agitated at 60° C. for a period of two hours. On cooling and removal of excess monomer and solvent there was obtained 23.6 g. of a polymeric material. The polymer was found to contain 5.5% of perfluorononene-1. The melt viscosity of the copolymer was $1 \times 10^6$ poises at 380° C. The copolymer could be molded into tough films.

Example V

Into a 330 ml. stainless steel pressure vessel was charged 23 ml. of perfluorodimethylcyclohexane, 40 g. of perfluoropentene-1, 15 g. of tetrafluoroethylene and 0.075 g. of perfluorobutyryl peroxide in 0.5 ml. of perfluorodimethylcyclohexane. The reaction vessel was agitated at autogenous pressure for 1.25 hours at 35° C. and 1.25 hours at 60° C. On cooling and removing excess monomer and solvent there was obtained 2.7 g. of a solid polymer material. The polymer was found to contain 1.7% of perfluoropentene-1. The polymer was melt extruded and found to have a melt viscosity of $1.8 \times 10^5$ poises at 380° C. and a melting point of 308 to 316° C. The polymer could be molded into tough films which could be creased 1758 times before a break occurred.

Example VI

Into a 330 ml. stainless steel pressure reactor was charged 40 g. of 8-hydroperfluorooctene-1, 10 g. of tetrafluoroethylene, and 0.075 g. of perfluorobutyryl peroxide in 0.5 ml. of perfluorodimethylcyclohexane. The reaction mixture was agitated at autogenous pressure for 3.5 hours at 35° C. and permitted to stand overnight at room temperature. On removal of excess monomer and solvent there was isolated 12.3 g. of a polymeric material. Analysis showed that the polymer contained 1% of the 8-hydroperfluorooctene-1. The copolymer could be pressed into films which could be creased more than 64,000 times without breaking. The copolymer was found to have a melt viscosity of $1.75 \times 10^6$ poises as determined by melt extrusion at 380° C.

Example VII

Into a 330 cc. stainless steel pressure vessel was charged 200 g. of water, 0.1 g. of ammonium persulfate and 5 g. of perfluoroheptene-1. The reaction vessel was then pressured to 400 p.s.i. with tetrafluoroethylene and agitated for 50 minutes at a temperature of 75° C. On cooling and removal of excess monomer and solvent there was obtained 35.5 g. of a solid polymer. The copolymer was found to have a melt viscosity of $6.4 \times 10^4$ poises.

The examples hereinabove have illustrated the preparation of copolymers of tetrafluoroethylene and fluorinated long chain olefins. Many variations of these examples will occur to those skilled in the art.

The melt viscosity of the copolymers of the present invention was measured by a rheometer in which the polymer was heated to 380° C. and then extruded under a constant pressure of 65 p.s.i. through an orifice having a diameter of 0.0825" and a length of 0.315". The viscosity was calculated from the weight of the extrudate obtained within a specified period. As shown by the examples the presence of small quantities of the fluoroolefin in the polymer chain decreases the melt viscosity of the polytetrafluoroethylene from $1 \times 10^{11}$ to $1 \times 10^{13}$ poises to $1 \times 10^6$ poises in the copolymer, a million fold decrease in viscosity. Yet this tremendous change in melt viscosity is accompanied with only a small change in melting point, which is reduced by 5 to 20° C. Thus the copolymers of tetrafluoroethylene and fluorinated olefins as employed in the present invention have the great advantages of combining the outstanding physical and chemical properties of polytetrafluoroethylene with sufficient melt flow at temperatures above the melting point to make melt extrusion and injection molding possible.

The copolymers of the present invention are useful in a wide variety of plastic applications. For example, they can be molded under pressure at temperatures above the melting point into films, foils, tapes, and massive articles. Many of the copolymers are exceptionally tough and abrasion resistant and have low coefficients of friction and can thus be employed as bearings, gears, bushings, pump pistons, pump diaphrams, and in general for those applications where chemically resistant, high softening materials are desirable. They can be fabricated into cellular or expanded forms which are particularly useful in applications where spongy, resilient articles having communicating pores are desired. They are useful as adhesives, e.g., as binders for glass, for example to prepare high temperature safety glass. These copolymers can also be fabricated into gasket and container closures. They can be employed as electrical insulators, such as spacer materials for cable construction, as stopoff and mask materials combining insulating and corrosion resisting properties for use in plating baths, for wire coating by wrapping on the wire as a tape or yarn, or by coating the wire by melt extrusion. Films of the copolymer can be employed as dielectrics for condenser construction, as spacers for storage batteries, etc. Containers and metallic objects in general can be lined or coated with films of the copolymer to furnish moisture resistant impervious, corrosion resistant coatings. The copolymers may be readily made adherent to binders by treatment with a non-metallic solution of an alkali metal. Flexible tubing can be fabricated by melt extrusion or by melt sealing a tape into cylindrical form. Filled compositions increasing the stiffness of the copolymer are readily prepared employing such fillers as carbon, asbestos, silica, etc. The copolymers may be used in the preparation of reinforced sheets and articles using glass and other suitable fibers as the reinforcing agent. Fibers of the copolymer can be obtained by melt spinning and these can be oriented by drawing, and knitted or woven into a variety of fabrics. Large monofils can be prepared, for example, by melt extrusion and are useful as brush bristles.

As many widely different embodiments of this invention may be made without departing from the spirit and scope thereof, it is to be understood that I do not limit myself to the specific embodiments thereof except as defined in the appended claims.

I claim:

1. A normally solid copolymer of tetrafluoroethylene and a fluorinated olefin, said copolymer containing 99.9% to 95% of tetrafluoroethylene and complementary therewith 0.1 to 5% by weight of the said copolymer of a fluorinated olefin having the general formula $$CF_2X-C_nF_{2n}-CF=CF_2$$

wherein X is a member of the class consisting of fluorine and hydrogen and $n$ is a number from 1 to 9.

2. The copolymer as set forth in claim 1 wherein the fluorinated olefin is perfluoroheptene-1.

3. The copolymer as set forth in claim 1 wherein the fluorinated olefin is perfluoropentene-1.

4. The copolymer as set forth in claim 1 wherein the fluorinated olefin is perfluorononene-1.

5. The copolymer as set forth in claim 1 wherein the fluorinated olefin is 8-hydroperfluorooctene-1.

6. The copolymer as set forth in claim 1 characterized in that the copolymer has a melting point above 300° C. and a melt viscosity below $1 \times 10^6$ poises.

7. The copolymer as set forth in claim 1 in form of a film.

8. The copolymer as set forth in claim 1 in form of a fiber.

References Cited in the file of this patent

UNITED STATES PATENTS

| | | |
|---|---|---|
| 2,468,664 | Hanford et al. | Apr. 26, 1949 |
| 2,479,367 | Joyce et al. | Aug. 16, 1949 |
| 2,668,864 | Hals et al. | Feb. 9, 1954 |
| 2,694,701 | Blum et al. | Nov. 16, 1954 |

OTHER REFERENCES

Adams and Bovey, Journal of Polymer Science, vol. IX, No. 6, pages 481–492.